US006546322B2

(12) United States Patent
Williams

(10) Patent No.: US 6,546,322 B2
(45) Date of Patent: Apr. 8, 2003

(54) METHOD OF CONTROLLING A VEHICLE STEERING APPARATUS

(75) Inventor: Daniel E. Williams, West Lafayette, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/903,142

(22) Filed: Jul. 11, 2001

(65) Prior Publication Data

US 2003/0014168 A1 Jan. 16, 2003

(51) Int. Cl.[7] .................................................. G06F 7/00
(52) U.S. Cl. .......................................... 701/41; 182/410
(58) Field of Search .............................. 701/41, 42, 43; 180/409, 410, 412, 443, 446

(56) References Cited

U.S. PATENT DOCUMENTS

| | | | |
|---|---|---|---|
| 4,947,327 A | 8/1990 | Kawagoe ................ 364/424.05 |
| 4,951,207 A | 8/1990 | Furukawa et al. ..... 364/424.05 |
| 5,086,862 A | * | 2/1992 | Graber et al. ................ 180/422 |
| 5,198,981 A | 3/1993 | Collier-Hallman et al. ...... 364/424.05 |
| 5,267,160 A | 11/1993 | Ito et al. ................ 364/424.05 |
| 5,978,721 A | 11/1999 | Kagawa et al. ................ 701/41 |
| 5,996,725 A | 12/1999 | Nishino et al. ............. 180/446 |
| 6,102,151 A | 8/2000 | Shimizu et al. ............. 180/446 |
| 6,112,846 A | 9/2000 | Mukai et al. ............... 180/446 |
| 6,116,372 A | 9/2000 | Mukai et al. ............... 180/446 |
| 6,134,490 A | 10/2000 | Ito et al. ........................ 701/42 |
| 6,173,223 B1 | 1/2001 | Liubakka et al. ............. 701/42 |

* cited by examiner

Primary Examiner—Yonel Beaulieu
(74) Attorney, Agent, or Firm—Tarolli, Sundheim, Covell & Tummino L.L.P.

(57) ABSTRACT

A method for controlling a steering apparatus (10) of a vehicle produces an error signal (128) by subtracting a hand wheel torque (118) and a column torque (126) from a desired operator torque (112) to be applied to a hand wheel (14) of the vehicle. A controller (102) receives at least one vehicle condition signal (106, 108, 110) and determines the desired operator torque (112). Inertia (116) and acceleration (120) of the hand wheel (14) of the vehicle are determined. A hand wheel torque (118) is calculated by multiplying the inertia (116) of the hand wheel (14) with the acceleration (120) of the hand wheel (14). The column torque (126) is determined by measuring torque across a torsion bar (50).

8 Claims, 2 Drawing Sheets

METHOD OF CONTROLLING A VEHICLE STEERING APPARATUS

TECHNICAL FIELD

The present invention relates to a method of controlling a power assisted steering apparatus for a vehicle.

BACKGROUND OF THE INVENTION

Various methods are known for controlling a power assisted steering apparatus for a vehicle. One known method is described in U.S. Pat. No. 5,198,981. The method analyzes vehicle condition signals during a steering maneuver to determine a steering torque command. The steering torque command represents the desired steering effort by the operator of the vehicle during the steering maneuver. The method also employs a torque sensor to measure a column torque actually applied by the operator. The column torque is preferably determined by measuring the torque across a torsion bar. The method compares the column torque to the steering torque demand to produce an error signal. The error signal is used to control an electric power assisted steering apparatus.

The method disclosed in U.S. Pat. No. 5,198,981 fails to consider the torque required to overcome the inertia of the hand wheel. This torque is felt by the operator and affects the overall steering effort exerted by the operator. A method for controlling a steering apparatus that accounts for the torque necessary to overcome hand wheel inertia is desirable.

SUMMARY OF THE INVENTION

The present invention is a method for controlling a steering apparatus of a vehicle. At least one signal indicative of a condition of the vehicle during a steering maneuver is provided to a controller. The vehicle condition signal is analyzed to determine a desired operator torque to be applied to a hand wheel of the vehicle. Inertia of the hand wheel of the vehicle is determined. An acceleration of the hand wheel is determined. A hand wheel torque is calculated by multiplying the inertia of the hand wheel with the acceleration of the hand wheel. A column torque across a torsion bar is determined. An error signal is produced by subtracting the hand wheel torque and the column torque from the desired operator torque. The steering apparatus is controlled with the error signal.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
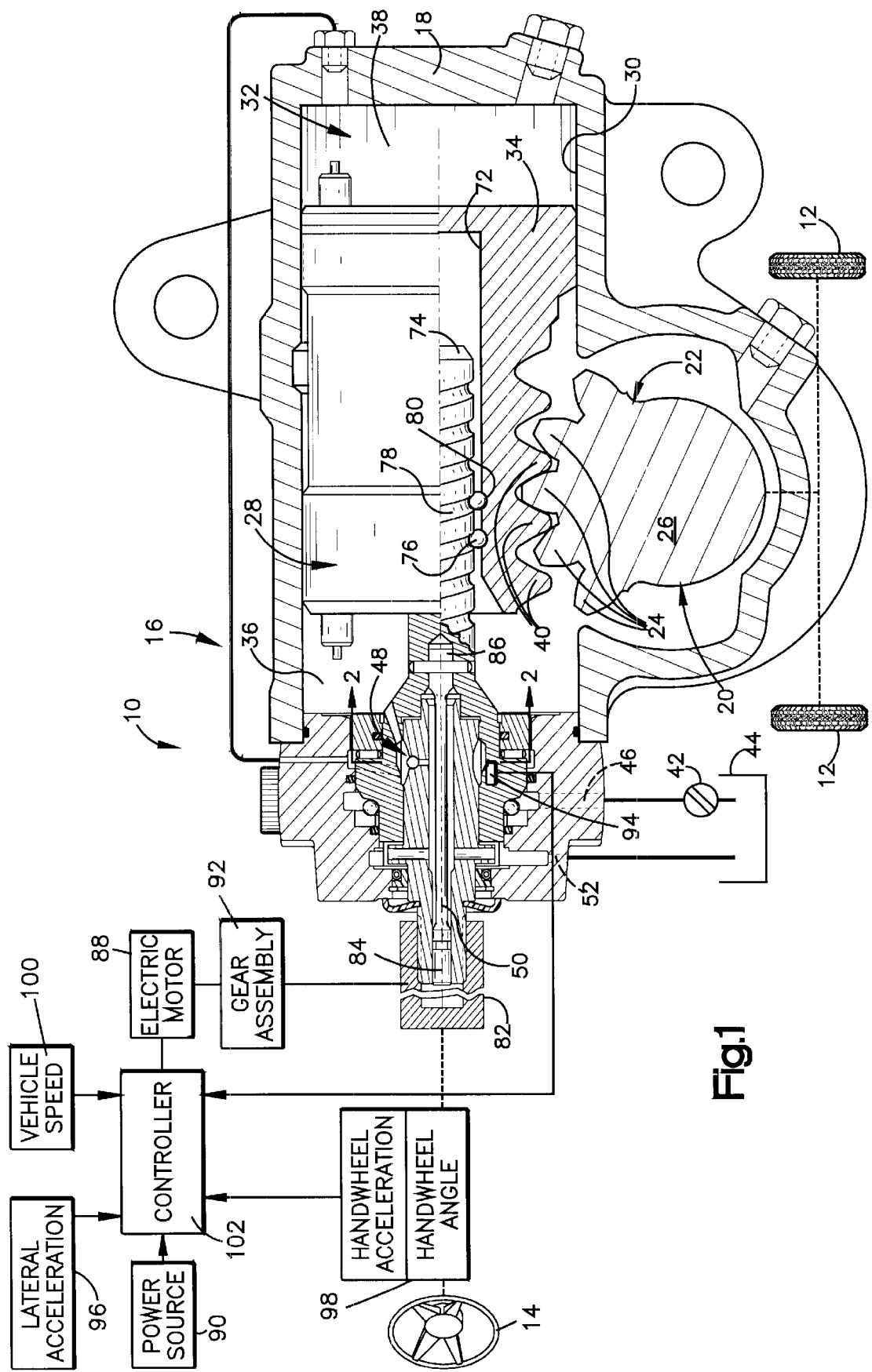
FIG. 1 is a schematic illustration of an apparatus used to perform the method of the present invention.

FIG. 1 illustrates an apparatus 10 used to perform the method of the present invention. The apparatus 10 is a vehicle power steering system for turning steerable wheels 12 of a vehicle (not shown) in response to rotation of a hand wheel 14 of the vehicle.

The apparatus 10 includes a hydraulic powered steering gear 16. The steering gear 16 includes a housing 18 and a drive mechanism 20. The drive mechanism 20 is moved in response to rotation of the hand wheel 14 of the vehicle. The motion of the drive mechanism 20 results in a turning of the steerable wheels 12 of the vehicle.

The drive mechanism 20 includes a sector gear 22 having a plurality of teeth 24. The sector gear 22 is fixed on an output shaft 26 that extends outwardly through an opening in the housing 18. The output shaft 26 is typically connected to a pitman arm that is connected to the steering linkage of the vehicle. The dashed lines in FIG. 1 represent the pitman arm and steering linkage. Thus, as the sector gear 22 rotates, the output shaft 26 is rotated to operate the steering linkage. As a result, the steerable wheels 12 of the vehicle are turned.

The steering gear 16 further includes a hydraulic motor 28 for moving the drive mechanism 20. The hydraulic motor 28 is located within the housing 18 of the steering gear 16. The housing 18 of the steering gear 16 has an inner cylindrical surface 30 defining a chamber 32. A piston 34 is located within the chamber 32 and divides the chamber 32 into opposite chamber portions 36 and 38. One chamber portion 36 is located on a first side of the piston 34 and the other chamber portion 38 is located on a second side of the piston 34. The piston 34 creates a seal between the respective chamber portions 36 and 38 and is capable of axial movement within the chamber 32. This axial movement of the piston 34 results in an increase in volume of one chamber portion 36 or 38 and a corresponding decrease in volume of the other chamber portion 36 or 38.

A series of rack teeth 40 is formed on the periphery of the piston 34. The rack teeth 40 act as an output for the hydraulic motor 28 and mesh with the teeth 24 formed on the sector gear 22 of the drive mechanism 20.

A pump 42 pumps hydraulic fluid from a reservoir 44 to the hydraulic motor 28. The engine of the vehicle drives the pump 42. However, the pump 42 could be driven otherwise, such as by an electric motor. The pump 42 forces hydraulic fluid into an inlet 46 of the housing 18. The inlet 46 directs the flow of the fluid to a directional control valve 48.

The directional control valve 48 directs the fluid to an appropriate chamber portion 36 or 38 of the hydraulic motor 28. The flow of hydraulic fluid toward one of the chamber portions 36 or 38 increases the pressure within that chamber portion 36 or 38. When the pressure of one chamber portion 36 or 38 increases relative to the pressure of the other chamber portion 36 or 38, the piston 34 moves axially and the volume of the higher-pressure chamber portion 36 or 38 increases. The volume of the higher-pressure chamber portion 36 or 38 increases until the pressure within each chamber portion 36 and 38 equalizes. As the volume of one chamber portion 36 or 38 increases, the volume of the other chamber portion 36 or 38 decreases. The decreasing chamber portion 36 or 38 is vented to allow a portion of the fluid contained in the decreasing chamber portion 36 or 38 to escape. The escaping fluid exits the housing 18 via a return 52 and is directed into the reservoir 44.

Figure 2:
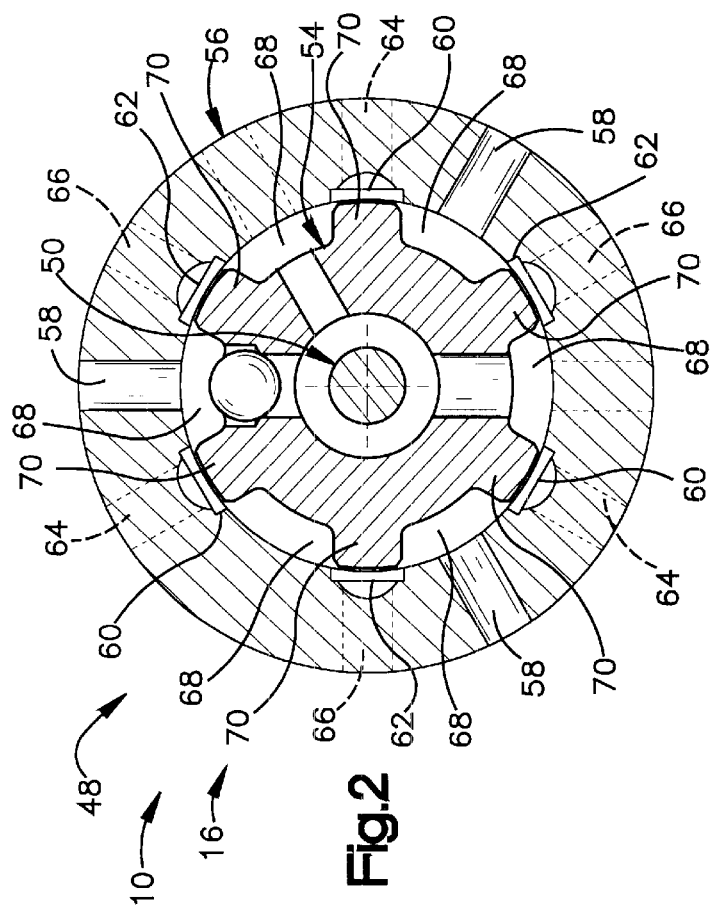
FIG. 2 is a view along line 2—2 of FIG. 1.

An embodiment of the directional control valve 48 is shown in FIG. 2. The directional control valve 48 contains a valve core part 54 and a valve sleeve part 56. A portion of the valve core part 54 is contained within and is rotatable relative to the valve sleeve part 56.

The valve sleeve part 56 includes three radially directed passages 58 that extend from an outer circumference of the valve sleeve part 56 to an inner circumference of the valve sleeve part 56. Each of these radial passages 58 is supplied with hydraulic fluid that enters the housing 18 through the inlet 46. Two axially extending grooves 60 and 62 are associated with each radial passage 58. The axially extending grooves 60 and 62 are located on the inner circumference of the valve sleeve part 56. As shown in FIG. 2, one groove 62 is located clockwise from and one groove 60 is located counter-clockwise from each radial passage 58. The grooves 60 and 62 are spaced an equal distance from the respective radial passage 58. Each groove 60 leads to a passage 64 extending radially outwardly through the valve sleeve part 56. Each groove 62 leads to a passage 66 extending radially outwardly through the valve sleeve part 56. Each groove 60 and 62 and associated passage 64 and 66 is associated with a particular chamber portion 36 and 38 of the hydraulic motor 28. For example, with reference to FIG. 2, each groove 62 and associated passage 66 located immediately clockwise of a radial passage 58 will supply hydraulic fluid to chamber portion 36; whereas, each groove 60 and associated passage 64 located immediately counter-clockwise from a radial passage 58 will supply hydraulic fluid to chamber portion 38.

Six grooves 68 are located around the outer circumference of the valve core part 54. The valve core part 54 also includes six protrusions 70. A protrusion 70 separates adjacent grooves 68 on the outer circumference of the valve core part 54. Side walls of the protrusion 70 form side walls of the grooves 68.

When the valve core part 54 is located relative to the valve sleeve part 56 such that each protrusion 70 of the valve core part 54 is centered relative to a respective passage 64 and 66 of the valve sleeve part 56, the directional control valve 48 is in a neutral position. FIG. 2 illustrates the directional control valve 48 in the neutral position. In this neutral position, the pressure within each chamber portion 36 and 38 of the hydraulic motor 28 is the same so that the piston 34 is stationary. When the valve core part 54 is rotated relative to the valve sleeve part 56, access to one of the two associated grooves 60 and 62 of the valve sleeve part 56 is restricted by a protrusion 70, while access to the other of the two associated grooves 60 and 62 is increased. This allows a greater amount of the hydraulic fluid to flow into the open groove 60 and 62, resulting in a pressurizing of the respective chamber portion 36 or 38 associated with that groove 60 or 62. As a result, the piston 34 of the hydraulic motor 28 is moved causing an increase in the volume of the respective chamber portion 36 or 38. For example, if the valve core part 54 is rotated clockwise, the groove 60 of the valve sleeve part 56 located on the counter-clockwise side of the radial passage 58 becomes blocked and the groove 62 located on the clockwise side of the radial passage 58 becomes open. Thus, a greater amount of the hydraulic fluid flows into the open groove 62 and travels to the chamber portion 36 of the hydraulic motor 28 associated with the open groove 62. The increased hydraulic fluid flowing to chamber portion 36 increases the pressure within chamber portion 36 and forces the piston 34 to move in an axial direction to increase the volume of chamber portion 36. As a result, the piston 34 rotates the sector gear 22 and the steerable wheels 12 are turned in the appropriate direction.

The piston 34 of the hydraulic motor 28 contains a bore 72, partially shown in FIG. 1, which is open toward the directional control valve 48. The valve sleeve part 56 and a follow-up member 74 form an integral one-piece unit that is supported for rotation relative to the piston 34 by a plurality of balls 76. The outer periphery 78 of the follow-up member 74 is threaded. The plurality of balls 76 interconnects the threaded outer periphery 78 of the follow-up member 74 with an internal thread 80 formed in the bore 72 of the piston 34. As a result of the interconnecting plurality of balls 76, axial movement of the piston 34 causes the follow-up member 74 and the valve sleeve part 56 to rotate. The rotation of the follow-up member 74 and the valve sleeve part 56 returns the directional control valve 48 to the neutral position.

The valve core part 54 of the directional control valve 54 is fixedly connected to an input shaft 82 (FIG. 1). As shown schematically by dashed lines in FIG. 1, the input shaft 82 is fixedly connected to the hand wheel 14 of the vehicle. Rotation of the hand wheel 14 results in rotation of the input shaft 82 and rotation of the valve core part 54.

The torsion bar 50 has a first end 84 and a second end 86. The first end 84 of the torsion bar 50 is fixed relative to the input shaft 82 and the valve core part 54. The second end 86 of the torsion bar 50 is fixed relative to the valve sleeve part 56 and the follow-up member 74. At least a portion of the torsion bar 50 extends through an axially extending bore 72 in the valve core part 54, as shown in FIGS. 1 and 2.

When the resistance to turning of the steerable wheels 12 of the vehicle is below a predetermined level, rotation of the hand wheel 14 is transferred through the torsion bar 50 and causes rotation of the follow-up member 74. As a result, the directional control valve 48 remains in the neutral position. Rotation of the follow-up member 74 causes movement of the piston 34 and results in turning of the steerable wheels 12. When resistance to turning the steerable wheels 12 of the vehicle is at or above the predetermined level, rotation of the follow-up member 74 is resisted. As a result, rotation of the hand wheel 14 rotates the first end 84 of the torsion bar 50 relative to the second end 86 of the torsion bar 50. The rotation of the first end 84 of the torsion bar 50 relative to the second end 86 of the torsion bar 50 applies a torque across the torsion bar 50 and causes the valve core part 54 to rotate relative to the valve sleeve part 56.

As discussed above, when the valve core part 54 rotates relative to the valve sleeve part 56, hydraulic fluid is directed toward one of the chamber portions 36 or 38. As a result, the piston 34 moves within the chamber 32. Movement of the piston 34 results in turning of the steerable wheels 12 of the vehicle, as well as, rotation of the follow-up member 74. As discussed above, rotation of the follow-up member 74 rotates the valve sleeve part 56 until the directional control valve 48 is again in the neutral position. When the directional control valve 48 is in the neutral position, the torque across the torsion bar 50 is removed and the first end 84 of the torsion bar 50 is no longer rotated relative to the second end 86 of the torsion bar 50.

The apparatus 10 also includes an electric motor 88. The electric motor 88 may be of any conventional design. The electric motor 88 receives electric power from a power source 90, preferably the vehicle battery. An output shaft (not shown) of the electric motor 88 is connected to the input shaft 82. Preferably, a gear assembly 92 is used to connect the output shaft of the electric motor 88 to the input shaft 82. When the electric motor 88 receives electric power, the output shaft of the electric motor 88 rotates the input shaft 82. Thus, the electric motor 88 is said to be "in series connection" with the hydraulic motor 28.

The apparatus 10 also includes a torque sensor 94 for sensing column torque and outputting a signal indicative of the column torque. Column torque is the torque across the torsion bar 50. The torque sensor may measure the rotational movement of the first end 84 of the torsion bar 50 relative to the second end 86 of the torsion bar 50. The movement of the valve core part 54 relative to the valve sleeve part 56 will also indicate the relative rotation between the first end 84 and the second end 86 of the torsion bar 50. The column torque can be determined using the material properties of the torsion bar 50 and the relative rotation across the torsion bar 50.

As shown in FIG. 1, the apparatus 10 also includes a plurality of vehicle condition sensors 96, 98, and 100 and a controller 102. Preferably, the vehicle condition sensors include a lateral acceleration sensor 96, a hand wheel rotation sensor 98, and a vehicle speed sensor 100. Each sensor 96, 98, and 100 is electrically connected to the controller 102.

The lateral acceleration sensor 96 continuously senses the lateral acceleration of the vehicle and generates an electrical signal indicative of the sensed lateral acceleration. The hand wheel rotation sensor 98 continuously senses the magnitude, rate, and acceleration of rotation of the vehicle hand wheel 14 and generates electrical signals indicative of these parameters. The hand wheel rotation magnitude is the angle of rotation of the hand wheel 14 relative to a straight ahead position of the hand wheel 14. Rotation of the hand wheel 14 in a first direction may be designated as a positive value and rotation of the hand wheel 14 in a second direction, opposite the first direction, may be designated as a negative value. The hand wheel rotation sensor 98, or the controller 102, may determine the rate of rotation of the hand wheel 14 by taking a time differential of the magnitude and may determine the hand wheel acceleration by taking a time differential of the rate of rotation. The vehicle speed sensor 100 continuously senses the vehicle speed and generates an electrical signal indicative of the speed.

Figure 3:
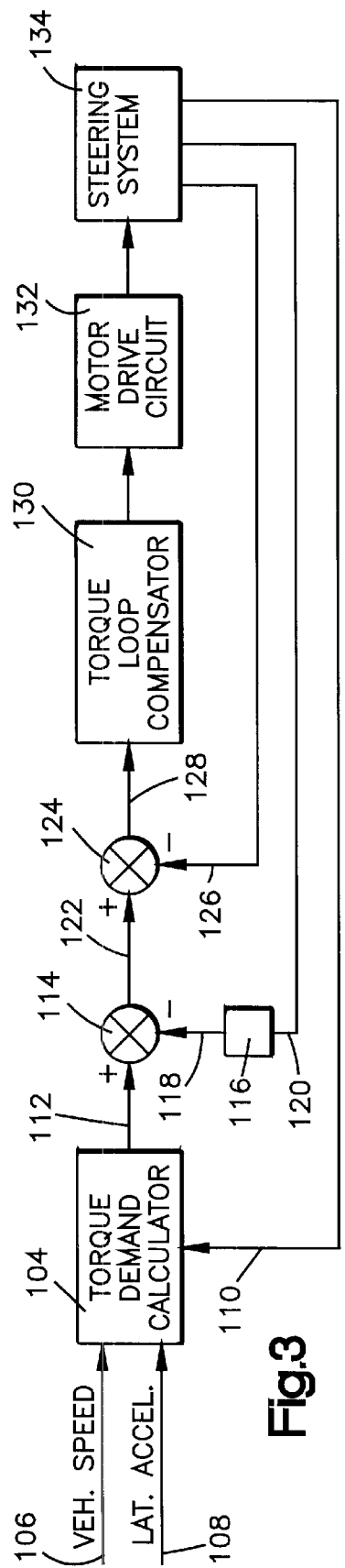
FIG. 3 is a process diagram of a control process for the apparatus of FIG. 1.

The controller 102 receives the signals generated by the lateral acceleration sensor 96, the hand wheel rotation sensor 98, and the vehicle speed sensor 100. Additionally, the controller 102 receives the column torque signal from the torque sensor 94. The controller 102 analyzes the respective signals and generates an error signal for controlling the electric motor 88. FIG. 3 illustrates the control process of the controller 102.

As shown schematically in FIG. 3, a portion of the controller 102, referred to as a torque demand calculator 104, receives the vehicle speed signal 106, the lateral acceleration signal 108, and the hand wheel rotation magnitude signal 110. The torque demand calculator 104 preferably follows an algorithm or a lookup table that is stored in a memory of the controller 102. When the vehicle speed signal 106, the lateral acceleration signal 108, and the hand wheel rotation magnitude signal 110 are received by the controller 102, either the algorithm is run on a processor of the controller 102 or the lookup table is consulted to determine a desired operator torque 112 to be applied to the hand wheel 14 of the vehicle. The desired operator torque 112 corresponds to the amount of torque an operator of the vehicle is to exert on the hand wheel 14 to perform the desired steering maneuver. The desired operator torque 112 is input into a first summation block 114.

Inertia 116 of the hand wheel 14 of the vehicle is determined. One known method of determining the inertia 116 of the hand wheel 14 is by using parallel axis theorems. The inertia 116 of the hand wheel 14 is stored in the memory of the controller 102.

The inertia 116 of the hand wheel 14 is used to calculate a hand wheel torque 118. The hand wheel torque 118 is the torque that the operator of the vehicle must exert on the hand wheel 14 to overcome the inertia 116 of the hand wheel 14.

As stated above, the acceleration of the hand wheel is also determined. The hand wheel acceleration signal is indicated at 120 in FIG. 3. To calculate the hand wheel torque 118, the hand wheel acceleration signal 120 is multiplied by the inertia 116 of the hand wheel 14. The hand wheel torque 118 is also input into the first summation block 114.

In the first summation block 114, a value for the hand wheel torque 118 is subtracted from the desired operator torque 112. The output of the first summation block 114, indicated at 122 in FIG. 3, is input into a second summation block 124. The column torque signal 126 from the torque sensor 94 is also input into the second summation block 124. In the second summation block 124, the column torque signal 126 is subtracted from the output 122 of the first summation block 114. The output of the second summation block 124 is the error signal, indicated at 128. Since both the hand wheel torque 118 and the column torque 126 sensed across the torsion bar 50 are subtracted from the desired operator torque 112 to produce the error signal 128, an equivalent process would be to add the hand wheel torque 118 to the column torque 126 in a first summation block to produce an actual operator torque necessary to perform the steering maneuver. The actual operator torque is then subtracted from the desired operator torque 112 in a second summation block to produce the error signal 128.

The error signal 128 is input into a portion of the controller 102, referred to as a torque loop compensator 130. The torque loop compensator 130 is a lead/lag compensator that receives the error signal 128 and based upon the error signal determines an electrical power output for the electric motor 88. The output of the torque loop compensator 130 is connected to a motor drive circuit 132 of the controller 102. The motor drive circuit 132 regulates the electric power from the power source 90 to the electric motor 88.

The apparatus 10 is illustrated in FIG. 3 as the steering system 134. When the electric motor 88 receives the electric power, the output shaft of the electric motor 88, through the gear assembly 92, rotates the input shaft 82. As a result, the electric motor 88 assists the operator in controlling the hydraulic motor 28 by adjusting the torque across the torsion bar 50. By using the electric motor 88 to help control the hydraulic motor 28, the apparatus 10 provides a desired steering assist and results in a desired steering feel to the operator.

The control process is repeated continuously during operation of the vehicle. As a result, the error signal 128 is updated continuously to reflect the changes in the vehicle conditions.

From the above description of the invention, those skilled in the art will perceive improvements, changes and modifications. Such improvements, changes and modifications within the skill of the art are intended to be covered by the appended claims.

Having described the invention, I claim the following:

1. A method for controlling a steering apparatus of a vehicle, the method comprising the steps of:
   (i) providing at least one signal indicative of a condition of the vehicle during a steering maneuver to a controller;
   (ii) analyzing the at least one vehicle condition signal to determine a desired operator torque to be applied to a hand wheel of the vehicle;
   (iii) determining inertia of the hand wheel of the vehicle;
   (iv) determining rotational acceleration of the hand wheel;
   (v) calculating a hand wheel torque by multiplying the inertia of the hand wheel with the rotational acceleration of the hand wheel;

(vi) determining a column torque across a torsion bar;

(vii) producing an error signal by subtracting the hand wheel torque and the column torque from the desired operator torque; and (viii) controlling the steering apparatus with the error signal.

2. The method as defined in claim 1 wherein the step of providing at least one signal indicative of a condition of the vehicle includes the steps of:

monitoring at least one of a speed of the vehicle, a lateral acceleration of the vehicle, and a hand wheel rotation magnitude of the vehicle; and generating a signal indicative of the condition monitored.

3. The method as defined in claim 1 wherein the step of determining an acceleration of the hand wheel of the vehicle includes the steps of:

monitoring a hand wheel rotation magnitude of the vehicle;

differentiating the hand wheel rotation magnitude relative to time; and differentiating the hand wheel rotation magnitude relative to time for a second time.

4. The method as defined in claim 1 the step of controlling the steering apparatus with the error signal includes the steps of:

determining an amount of electric power to apply to an electric motor with the error signal;

applying the electric power to the electric motor to rotate an input shaft associated with a hydraulic motor.

5. The method as defined in claim 4 wherein the step of applying the electric power to the electric motor to rotate an input shaft associated with a hydraulic motor includes the steps of:

connecting an output of the electric motor to a gear assembly;

connecting the gear assembly to the input shaft; and rotating the output of the electric motor to affect rotation of the input shaft.

6. The method as defined in claim 1 wherein the step of determining a column torque across a torsion bar includes the steps of:

providing a torsion bar having known material properties;

monitoring the rotation of a first end of the torsion bar relative to a second end of the torsion bar; and determining the column torque using the known properties and the relative rotation across the torsion bar.

7. The method as defined in claim 1 wherein the step of analyzing the at least one vehicle condition signal to determine a desired operator torque to be applied to a hand wheel of the vehicle includes the steps of:

storing in a memory of the controller a lookup table comprising data correlating the at least one vehicle condition signal to a desired operator torque; and consulting the lookup table with the at least one vehicle condition signal to determine the desired operator torque.

8. The method as defined in claim 1 further including the step of:

continuously repeating the method during operation of the vehicle.

* * * * *